US009020441B2

(12) United States Patent
Koga et al.

(10) Patent No.: US 9,020,441 B2
(45) Date of Patent: Apr. 28, 2015

(54) SIGNAL TRANSFER TIME MEASUREMENT APPARATUS

(71) Applicant: Kabushiki Kaisha Tokai Rika Denki Seisakusho, Aichi (JP)

(72) Inventors: Kenichi Koga, Aichi (JP); Daisuke Kawamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 85 days.

(21) Appl. No.: 13/930,758

(22) Filed: Jun. 28, 2013

(65) Prior Publication Data
US 2014/0011458 A1 Jan. 9, 2014

(30) Foreign Application Priority Data
Jul. 6, 2012 (JP) ................. 2012-152573

(51) Int. Cl.
*H04B 17/00* (2006.01)
*H04W 24/00* (2009.01)
*B60R 25/24* (2013.01)

(52) U.S. Cl.
CPC .............. *H04W 24/00* (2013.01); *B60R 25/24* (2013.01); *H04B 17/104* (2015.01)

(58) Field of Classification Search
CPC ........................... H04W 24/10; H04B 17/0037
USPC ....................................................... 455/67.11
See application file for complete search history.

(56) References Cited

U.S. PATENT DOCUMENTS

| 8,391,234 B2 * | 3/2013 | Nouda et al. ................. 370/330 |
| 2006/0164209 A1 | 7/2006 | De Zeeuw |
| 2009/0206989 A1 | 8/2009 | Leitch |

FOREIGN PATENT DOCUMENTS

| JP | 09-170364 | 6/1997 |
| JP | 2003-013644 | 1/2003 |
| JP | 2006-512515 | 4/2006 |
| JP | 2008-515315 | 5/2008 |
| WO | 2004/010388 | 1/2004 |
| WO | 2006/035361 | 4/2006 |

* cited by examiner

*Primary Examiner* — Eugene Yun
(74) *Attorney, Agent, or Firm* — Greenblum & Bernstein, P.L.C.

(57) ABSTRACT

A signal transfer time measurement apparatus measures a transfer time of a signal transmitted from a base station and returned via a terminal to the base station. The signal transfer time measurement apparatus includes a signal processor that divides the signal into a plurality of frequency bands and transmits the signal in the plurality of frequency bands.

11 Claims, 6 Drawing Sheets

Frequency Spectrums of Transmission Signal Str

Frequency Response of Filter 17

Transfer Time Tx Less Than Threshold Tk

Transfer Time Tx Greater Than or Equal to Threshold Tk

Frequency Spectrum of Transmission Signal

SIGNAL TRANSFER TIME MEASUREMENT APPARATUS

CROSS-REFERENCE TO RELATED APPLICATIONS

This application is based upon and claims the benefit of priority from prior Japanese Patent Application No. 2012-152573, filed on Jul. 6, 2012, the entire contents of which are incorporated herein by reference.

FIELD

The present invention relates to a signal transfer time measurement apparatus that measures a transfer time of a signal communicated between a base station and a terminal.

BACKGROUND

A signal transfer time measurement apparatus measures the time from when a signal (radio wave) is transmitted from a base station to a terminal to when a signal (radio wave) transmitted from the terminal is received by the base station. Japanese Laid-Open Patent Publication Nos. 9-170364 and 2003-13644 and Japanese National Phase Laid-Open Patent Publication Nos. 2006-512515 and 2008-515315 each describe an electronic key system including such type of a signal transfer time measurement apparatus. When ID verification is performed between a vehicle and an electronic key through wireless communication, the signal transfer time measurement apparatus measures the time a signal is transferred between the vehicle and the electronic key. By measuring the signal transfer time, ID verification may be prohibited when the electronic key is connected to the vehicle using a relay in an unauthorized manner.

Referring to FIG. 11, a wideband signal may be used as a transmission signal (impulse) transmitted from a base station to a terminal. FIG. 12 illustrates changes in the signal to noise ratio (SNR) when changing the frequency band of the transmission signal from a narrowband to a wideband. As illustrated in FIG. 12, when widening the frequency band of the transmission signal, the power peak value of the transmission signal received by the base station increases, and the difference increases between the power level of the transmission signal and the power level of a noise wave. This improves the SNR, and increases the likeliness of communication establishment.

SUMMARY

When using a wideband signal as the transmission signal, a reception circuit suitable for a wideband is used. In this case, it is desirable for the reception circuit components such as a down converter and a filter to have a flat frequency characteristic in a wide frequency band. However, this leads to complicated reception circuit components and increases the component cost. Accordingly, there is a demand for an apparatus that measures the signal transfer time with further accuracy and without using a wideband signal as the transmission signal.

One aspect of the present invention is a signal transfer time measurement apparatus that measures a transfer time of a signal transmitted from a base station and returned via a terminal to the base station. The signal transfer time measurement apparatus includes a signal processor that divides the signal into a plurality of frequency bands and transmits the signal in the plurality of frequency bands.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

A first embodiment of a signal transfer time measurement apparatus will now be described with reference to FIGS. 1 to 8.

Figure 1:
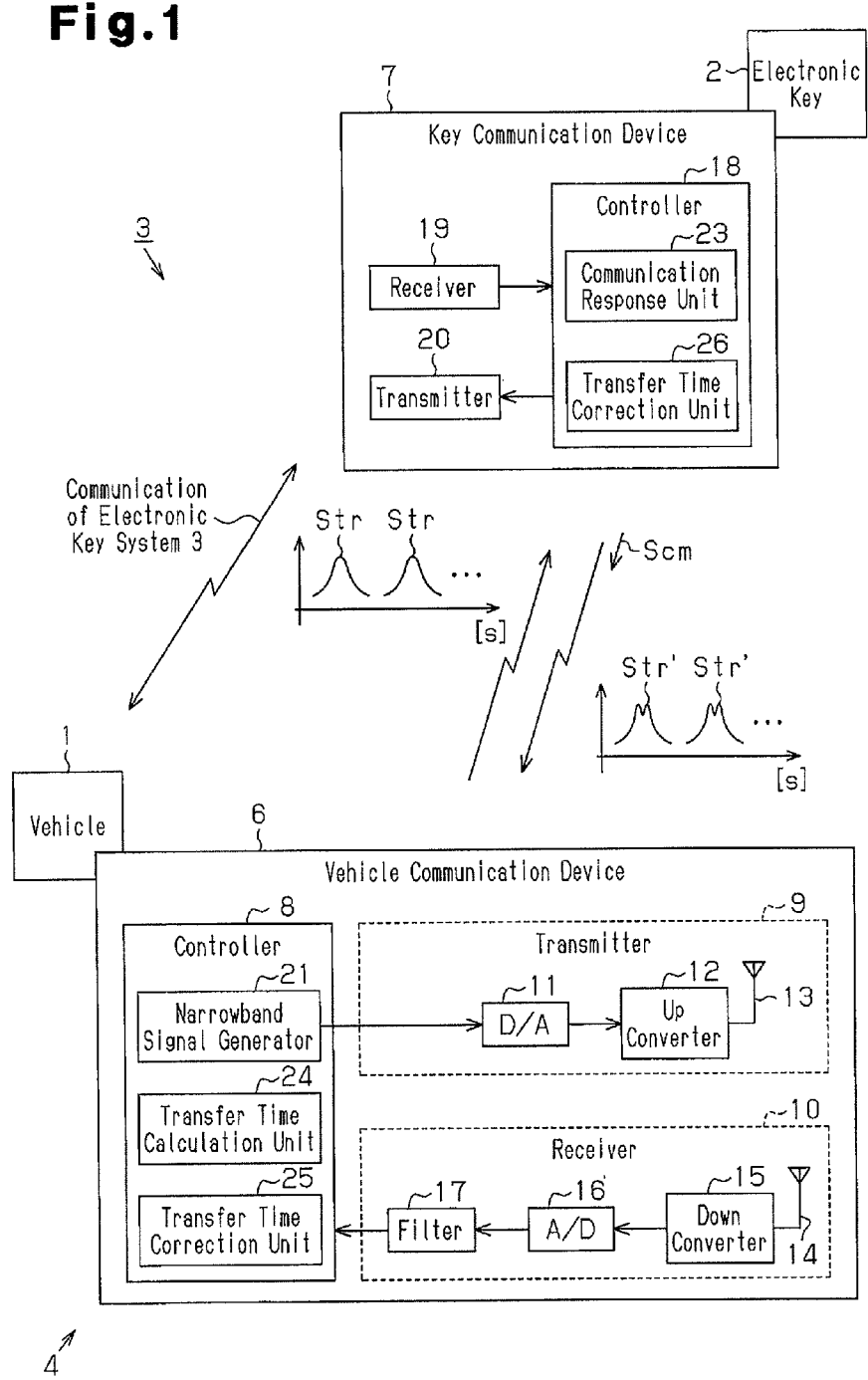
FIG. 1 is a schematic block diagram illustrating a first embodiment of a signal transfer time measurement apparatus.

Referring to FIG. 1, in an electronic key system 3, a vehicle 1 performs wireless communication with an electronic key 2 to carry out ID verification on the electronic key 2. When the ID verification of the electronic key 2 is accomplished, for example, the locking and unlocking of vehicle doors or the starting of the engine is permitted. The electronic key system 3 may be, for example, a key-free operation system that performs ID verification when the vehicle 1 starts communication or a wireless key system that performs ID verification when the electronic key 2 starts communication.

The electronic key system 3 includes a signal transfer time measurement apparatus 4 that measures the transfer time of a signal transmitted from the vehicle 1 and returned via the electronic key 2 to the vehicle. For example, the vehicle 1 transmits a transmission signal Str (impulse) to the electronic key 2. In response to the transmission signal Str, the electronic key returns a corresponding reply signal Str' to the vehicle 1. The reply signal Str' may have the same waveform as the transmission signal Str. However, in the present embodiment, the reply signal Str' and the transmission signal Str have different waveforms. The signal transfer time measurement apparatus 4 obtains a transfer time Tx by measuring the time from when the vehicle 1 transmits the transmission signal Str to when the vehicle 1 receives the reply signal Str'. The signal transfer time measurement apparatus 4 (or a controller of the vehicle 1) verifies the electronic key 2 based on the transfer time Tx, which corresponds to the distance between the vehicle 1 and the electronic key 2. Thus, when the transfer time Tx is longer than or equal to a threshold Tk, there is a high possibility that the present communication between the vehicle 1 and the electronic key 2 is being performed via a relay 5 and is an unauthorized communication (relay attack). In this manner, the signal transfer time measurement apparatus 4 compares the transfer time Tx and the threshold Tk to verify the electronic key 2.

The signal transfer time measurement apparatus 4 includes a vehicle communication device 6 arranged in the vehicle 1 and a key communication device 7 arranged in the electronic key 2. The vehicle communication device 6 is one example of a base station, and the key communication device 7 is one example of a terminal.

The vehicle communication device 6 includes a controller that controls the operation of the vehicle communication device 6 during a signal transfer time measurement process. The controller 8 is connected to a transmitter 9, which transmits radio waves on, for example, a low frequency (LF) band, and a receiver 10, which transmits radio waves on, for example, an ultrahigh frequency (UHF) band. The transmitter 9 includes a D/A conversion circuit 11, which performs D/A conversion on transmission data, an up converter 12, which amplifies the D/A-converted transmission data, and a transmission antenna 13, which transmits the amplified transmission data on a radio wave. The receiver 10 includes a reception antenna 14, which receives the radio wave, a down converter 15, which converts the reception data to a predetermined frequency (intermediate frequency or the like), an A/D conversion circuit 16, which A/D converts the down-converted reception data, and a filter 17, which filters the A/D-converted reception data. The filter 17 is, for example, a band pass filter. The filter 17 is one example of an improving unit.

The key communication device 7 includes a controller 18 that controls the operation of the key communication device 7 during a signal transfer time measurement process. Further, the key communication device 7 includes a receiver 19 and a transmitter 20, which are configured in the same manner as the receiver 10 and the transmitter 9 of the vehicle communication device 6.

The signal transfer time measurement apparatus 4 does not use a wideband signal as the transmission signal Str. The signal transfer time measurement apparatus 4 divides a predetermined frequency band into a plurality of frequency bands and transmits the transmission signal Str as a plurality of narrowband signals to realize a higher signal to noise ratio (SNR). To realize a high SNR, a wideband signal is generally used as a transmission signal. In this case, however, a reception circuit requires a down converter or filter that is suitable for use in a wide frequency band. This leads to complicated reception circuit components and increases the component cost. Thus, the use of a wideband signal is not desirable.

The controller 8 of the vehicle communication device 6 includes a narrowband signal generator 21 that generates a plurality of narrowband signals as the transmission signal Str. For example, when the electronic key system 3 starts communication (or during or after communication), the narrowband signal generator 21 generates a transmission signal Str including a plurality of narrowband signals. Then, the transmitter 9 transmits the transmission signal Str to the electronic key 2. In the present embodiment, although not particularly limited, the narrowband signal generator 21 generates a plurality of transmission signals Str, and the transmitter 9 transmits the transmission signal Str a multiple number of times. In other words, the transmission signal Str is repetitively generated in fixed intervals by the narrowband signal generator 21 and cyclically transmitted from the transmitter 9. The narrowband signal generator 21 is one example of a signal processor.

Figure 2:
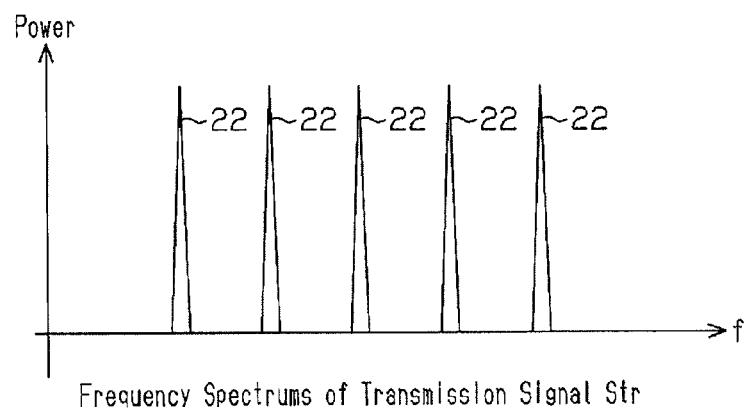
FIG. 2 is a schematic diagram illustrating frequency spectrums of a transmission signal.

FIG. 2 illustrates the frequency spectrums of the transmission signal Str. The transmission signal Str includes a plurality of (e.g., five) narrowband signals, namely, frequency spectrums 22. The frequency spectrums 22 (i.e., narrowband signals) are formed at equal intervals and with identical shapes.

Referring to FIG. 1, the controller 18 of the key communication device 7 includes a communication response unit 23 that functions in response to the receipt of the transmission signal Str from the vehicle communication device 6. When the receiver 19 receives the transmission signal Str from the vehicle communication device 6, the communication response unit 23 generates a reply signal Str' in correspondence with the transmission signal Str. In this case, the communication response unit 23 generates the reply signal Str' as a plurality of narrowband signals. Further, the communication response unit 23 adds a certain change to the received transmission signal Str to generate the reply signal Str'. An example of a certain change includes a process for changing the waveform of a received signal to another waveform at a predetermined timing during communication (during a signal transfer time measurement process). In this case, the controller 8 of the vehicle communication device 6 knows in advance the shape of the waveform changed by the communication response unit 23. The transmitter 20 of the key communication device 7 transmits the reply signal Str' generated by the communication response unit 23 to the vehicle communication device 6. In this manner, signals are transmitted and received between the vehicle communication device 6 and the key communication device 7. The vehicle communication device 6 receives the reply signal Str' from the key communication device 7 with the receiver 10.

Figure 3:
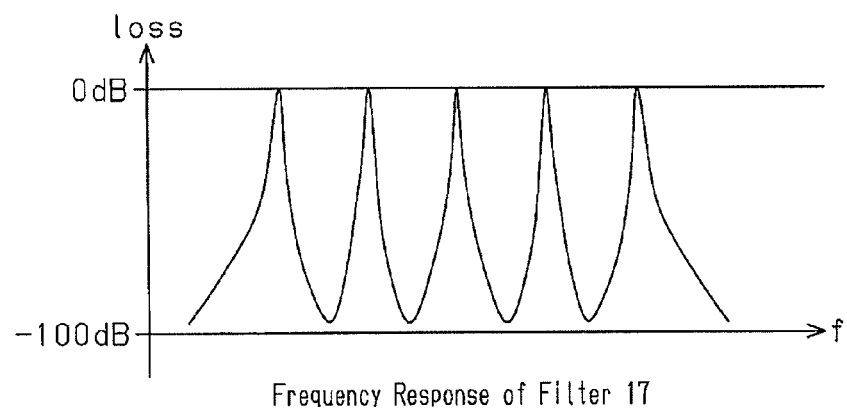
FIG. 3 is a schematic diagram illustrating a frequency response of a filter.

FIG. 3 illustrates an example of a filter shape (filter coefficient) set for the filter 17. As illustrated in FIG. 3, the filter 17 is formed to have a filter shape allowing for passage of the frequency of the narrowband signals in the reply signal Str'. When the vehicle communication device 6 receives the reply signal Str' from the key communication device 7, the filter 17 filters the reply signal Str'.

Referring to FIG. 1, the controller 8 of the vehicle communication device 6 includes a transfer time calculation unit 24. The transfer time calculation unit 24 calculates a transfer time Tx of a signal transmitted from the vehicle communication device 6 and returned via the key communication device 7 to the vehicle communication device 6. In the present embodiment, the transfer time calculation unit 24 calculates the transfer time Tx by measuring the time from when the vehicle communication device 6 transmits the transmission signal Str to when the vehicle communication device 6 receives the reply signal Str' from the key communication device 7. For example, the transfer time calculation unit 24 calculates the transfer time Tx for an nth one of the plurality of transmission signals Str.

The signal transfer time measurement apparatus 4 has a clock deviation calculation function and a transfer time correction function. The clock deviation calculation function calculates a clock deviation of the vehicle communication device 6 and a clock deviation of the key communication device 7. The transfer time correction function corrects the transfer time Tx based on each clock deviation. A clock deviation of the vehicle communication device 6 leads to, for example, a clock deviation of the transmission signal Str. A clock deviation of the key communication device 7 leads to, for example, a frequency deviation of the reply signal Str'. Each of these frequency deviations results in an error of the transfer time Tx. In the present embodiment, the controller 8 of the vehicle communication device 6 includes a transfer time correction unit 25 that calculates a clock deviation of the vehicle communication device 6 and a clock deviation of the key communication device 7 to correct the transfer time Tx. Further, the controller 18 of the key communication device 7 includes a transfer time correction unit 26 that performs a process required to calculate a clock deviation of the key communication device 7 and a process required to correct the transfer time Tx. Each of the transfer time correction units 25 and 26 is an example of a clock deviation calculation unit and a correction unit.

During the transmission and reception of the transmission signal Str and the reply signal Str', the transfer time correction unit 26 of the key communication device 7 generates a reference signal Scm having a predetermined frequency that is required to calculate a clock deviation of the key communication device 7. For example, the reference signal Scm is a signal frequency signal and transmitted from the key communication device 7 at a predetermined timing that differs from the transmission of the reply signal Str'. When the vehicle communication device 6 receives the reference signal Scm, the transfer time correction unit 25 of the vehicle communication device 6 calculates a reception frequency of the reference signal Scm and calculates a difference (frequency deviation) between the reception frequency and a reference frequency. Further, the transfer time correction unit 25 calculates a correction value based on the difference and corrects the transfer time Tx with the correction value. The transfer time correction unit 25 also calculates a clock deviation of the key communication device 7 and corrects a transfer time Tx in accordance with the clock deviation of the key communication device 7.

The operation of the signal transfer time measurement apparatus 4 will now be described with reference to FIGS. 4 to 8.

Figure 4:
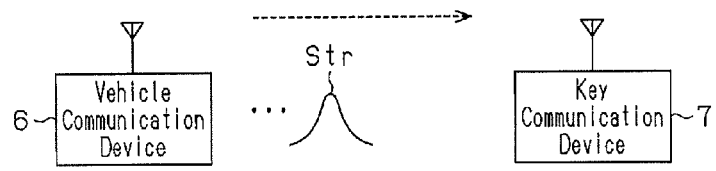
FIG. 4 is a schematic diagram illustrating a transmission process of a transmission signal from a vehicle communication device to a key communication device.

Referring to FIG. 4, the vehicle communication device 6 transmits a plurality of transmission signals Str from the transmitter 9 to the key communication device 7. Here, the narrowband signal generator 21 generates each transmission signal Str as a plurality of narrowband signals.

Figure 5:
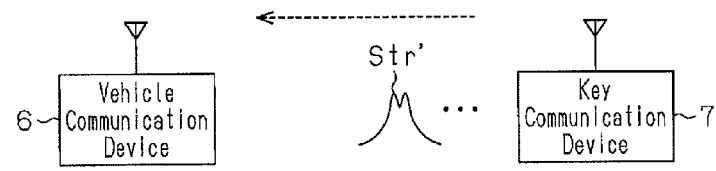
FIG. 5 is a schematic diagram illustrating a reply process of a transmission signal from the key communication device to the vehicle communication device.

Referring to FIG. 5, when receiving the transmission signal Str, the key communication device 7 returns a reply signal Str' to the vehicle communication device 6. Here, the communication response unit 23 generates each reply signal Str' as a plurality of narrowband signals. Further, the communication response unit 23 adds a certain change to the reply signal Str' at a predetermined timing during communication of the transmission signals Str. For example, when receiving any of the transmission signals Str transmitted from the vehicle communication device 6, the communication response unit 23 generates a reply signal Str' having a waveform that differs from the waveform of the transmission signal Str.

The vehicle communication device 6 receives the reply signal Str' returned from the key communication device 7 with the receiver 10. The filter 17 filters the reply signal Str' and passes narrowband signals in the reply signal Str'. The receiver 19 of the key communication device 7 filters the transmission signal Str in the same manner.

Figure 6:
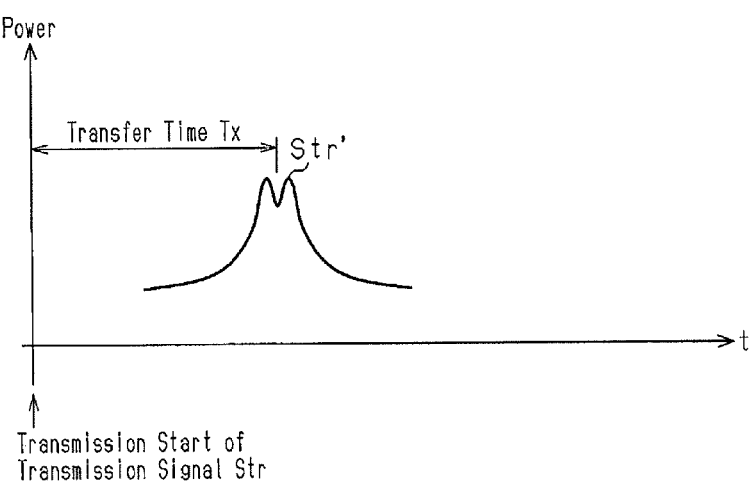
FIG. 6 is a schematic waveform chart of a transmission signal received by the vehicle communication device.
Figure 7A:
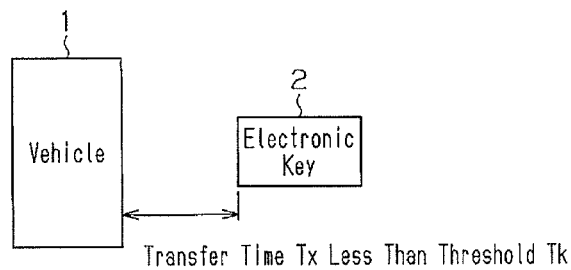
FIG. 7A is a diagram illustrating an example of authorized communication.
Figure 7B:
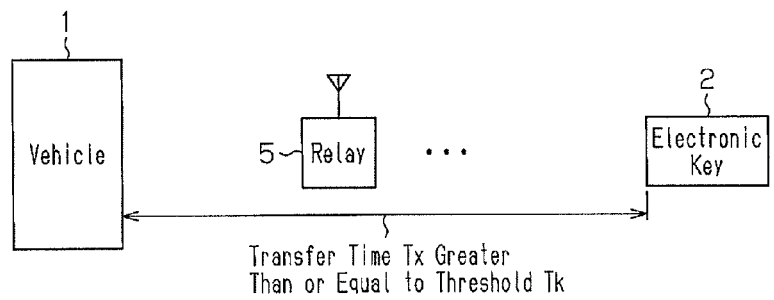
FIG. 7B is a diagram illustrating an example of unauthorized communication.

Referring to FIG. 6, the transfer time calculation unit 24 detects a power (voltage) peak, that is, a peak of an impulse, in an nth one of the received reply signals Str' (impulses). Further, as the transfer time Tx, the transfer time calculation unit 24 calculates the time required to transmit and receive signals (here, transmission signal Str and reply signal Str') between the vehicle communication device 6 and the key communication device 7. Referring to FIG. 7A, when the transfer time Tx is less than a threshold Tk, the controller 8 of the vehicle 1 determines that the present communication is authorized communication. In this case, the controller 8 permits the establishment of communication. Referring to FIG. 7B, when the transfer time Tx is greater than or equal to a threshold Tk, the controller 8 determines that the present communication is unauthorized communication performed via the relay 5. In this case, the controller 8 does not permit the establishment of communication.

During the communication of a plurality of transmission signals Str, the transfer time correction unit 26 of the key communication device 7 generates a reference signal Scm having a predetermined frequency (including error). The reference signal Scm is transmitted from the transmitter 20 at a predetermined timing.

When the vehicle communication device 6 receives the reference signal Scm, the transfer time correction unit 25 of the vehicle communication device 6 calculates the difference between the reception frequency (including error) and the reference frequency to calculate the clock deviation of the key communication device 7 from the difference. Further, the transfer time correction unit 25 calculates the clock deviation of the vehicle communication device 6. For example, when the clock deviation of the vehicle communication device 6 is 10 Hz, and the clock deviation of the key communication device 7 is 10 Hz, the frequency deviation between the transmission signal Str and the reply signal Str' may be 20 Hz. The transfer time correction unit 25 calculates a correction value in correspondence with the frequency deviation and corrects the transfer time Tx based on the correction value.

For example, when a clock deviation occurs in the key communication device 7, the transfer time correction unit 25 of the vehicle communication device 6 transmits the correction value corresponding to the clock deviation of the key communication device 7 together with the transmission signal Str. The transfer time correction unit 26 of the key communication device 7 delays the transmission of the reply signal Str' by a delay time corresponding to the correction value to optimize the radio wave transmission timing of the key communication device 7. Alternatively, the transfer time correction unit 26 changes the filter shape of the receiver 19 in the key communication device 7 based on the correction value to improve the signal reception accuracy. The transfer time correction unit 25 of the vehicle communication device 6 may change the filter shape of the receiver 10 to compensate for the clock deviation of the key communication device 7. Alternatively, the transfer time correction unit 25 may directly correct the transfer time Tx using the correction value corresponding to the clock deviation of the key communication device 7. In the same manner, when a clock deviation occurs in the vehicle communication device 6, the transfer time correction unit 25 of the vehicle communication device 6 delays the transmission of the transmission signal Str, changes the filter shape of the receiver 10, or directly corrects the transfer time Tx based on a correction value corresponding to the clock deviation of the vehicle communication device 6. Alternatively, the transfer time correction unit 26 of the key communication device 7 may change the filter shape of the receiver 19 to compensate for the clock deviation of the vehicle communication device 6 based on the correction value transmitted from the vehicle communication device 6.

Figure 8:
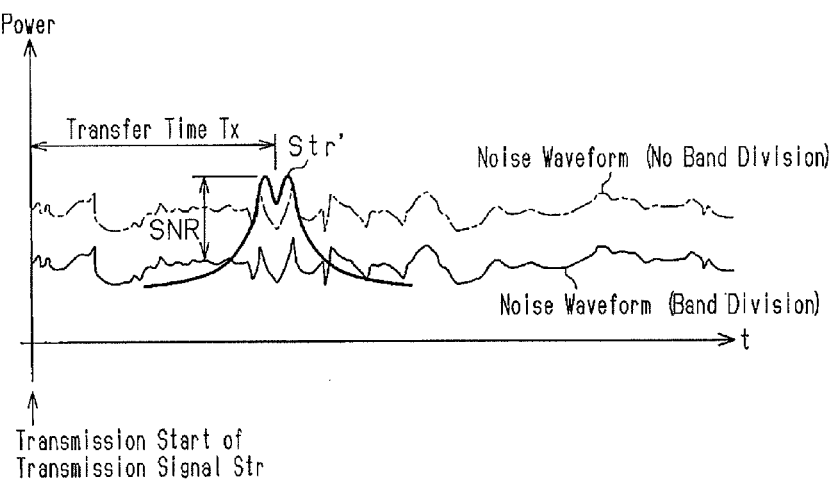
FIG. 8 is a schematic waveform chart illustrating the SNR when band division is not performed and the improved SNR when band division is performed.

FIG. 8 illustrates the improvement of the SNR when band division is performed as compared with when band division is not performed. In FIG. 8, the horizontal axis represents time, and the vertical axis represents the power of the reply signal Str'. The SNR corresponds to the difference between the peak of the reply signal Str' (impulse) and the noise power level (e.g., average value). When transmitting the transmission signal Str or the reply signal Str' without performing band division, that is, when transmitting a single wideband signal, the noise power level (noise waveform illustrated by dashed line in FIG. 8) relatively increases.

When transmitting the transmission signal Str or the reply signal Str' after performing band division, that is when transmitting a plurality of narrowband signals, the noise power level (noise waveform illustrated by solid line in FIG. 8) is low as compared to when band division is not performed. This is because the frequency used by the transmission signal Str or the reply signal Str' is limited (restricted) and noise such as heat is reduced. As a result, the noise power level decreases. In this manner, as long as the noise power level is low, a large SNR is obtained. This increases the possibility of communication establishment.

The present embodiment has the advantages described below.

(1) In the signal transfer time measurement apparatus 4 that measures the transfer time Tx of signals communicated between the vehicle communication device 6 and the key communication device 7, the transmission signal Str from the vehicle communication device 6 and the reply signal Str' from the key communication device 7 are transmitted as a plurality of narrowband signals. That is, the frequency band of a signal communicated between the vehicle communication device 6 and the key communication device 7 is restricted. This allows for reduction in noise (noise power), such as heat, and improves the SNR. Further, the division of each of the transmission signal Str and the reply signal Str' is achieved through a simple configuration. Thus, for example, the receivers 10 and 19 need not have complicated circuit configurations and thereby keeps the component cost low.

(2) The vehicle communication device 6 filters the reply signal Str' with the filter 17 that has a filter shape corresponding to the narrowband signals. This configuration allows for appropriate noise reduction and improves the SNR.

(3) The filter 17 is used to improve the SNR of the transmission signal Str. This simplifies the configuration for improving the SNR.

(4) The frequency spectrums 22 of the narrowband signals in the transmission signal Str are formed in equal intervals with identical shapes. Thus, the transmission signal Str including a plurality of narrowband signals may easily be formed. The same applies for the reply signal Str'.

(5) The transmission signal Str including the narrowband signals is cyclically generated and repeatedly transmitted. This configuration allows a plurality of transmission signals Str to be used for the measurement of the transfer time Tx. Thus, the measurement accuracy of the transfer time Tx may be further improved.

(6) The signal transfer time measurement apparatus 4 includes clock deviation calculation and transfer time correction functions. This allows for the correction of errors in the transfer time Tx caused by clock deviations of the vehicle communication device 6 and the key communication device 7. Thus, the measurement accuracy of the transfer time Tx may be further improved.

(7) The vehicle communication device 6 receives the reference signal Scm transmitted from the key communication device 7 and checks for a frequency deviation in the reference signal Scm. This configuration allows for correction of errors in the transfer time Tx caused by a clock deviation in the vehicle communication device 6 and errors in the transfer time Tx caused by a clock deviation in the key communication device 7. Further, clock deviations may be directly obtained from the reference signal Scm transmitted from the key communication device 7. Thus, the correction value of the transfer time Tx may be accurately obtained.

(8) The reference signal Scm has a single frequency. This simplifies the calculation of frequency deviations.

(9) When correcting the transfer time Tx due to a clock deviation, the filter shape may be corrected to accurately receive signals in the subsequent communication.

(10) The key communication device 7 adds a certain change to the received transmission signal Str to generate a reply signal Str' and return the reply signal Str' to the vehicle communication device 6. Thus, even when the waveform of the transmission signal Str is stored in the relay 5 and unauthorized communication is performed through the relay 5, the reply signal Sr' that differs from the transmission signal Str is used. This hinders the establishment of communication with the relay 5 and ensures security against unauthorized communication.

A second embodiment will now be described with reference to FIG. 9. The second embodiment differs from the first embodiment in the transmission control of the transmission signal Sr. Otherwise, the configuration of the second embodiment is basically the same as the first embodiment. Like or same reference numerals are given to those components that are the same as the corresponding components of the first embodiment. Such components will not be described in detail.

Figure 9:
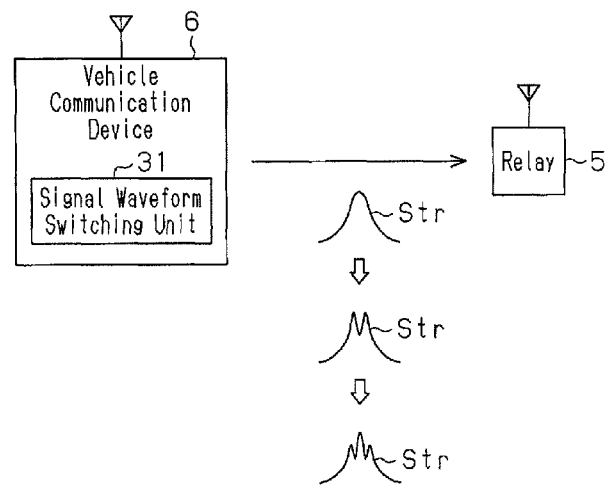
FIG. 9 is a schematic diagram illustrating a second embodiment of a signal transfer time measurement apparatus.

Referring to FIG. 9, the controller 8 of the vehicle communication device 6 includes a signal waveform switching unit 31 that switches the waveform of the transmission signal Str, which is a cyclic repetitive signal. When a plurality of transmission signals Str are transmitted from the vehicle communication device 6 to the key communication device 7, the signal waveform switching unit 31 switches the waveform of the transmission signal Str to another shape at a certain timing (may be at the start of or during communication). The waveform switching of the transmission signal Str may be performed only once (i.e., only one type) or multiple times (i.e., multiple types). FIG. 9 illustrates a case when the waveform of the transmission signal Str is switched a number of times.

When unauthorized communication is performed with the relay 5, for example, the waveform of the transmission signal Str may be stored in the relay 5. For example, when receiving the transmission signal transmitted from the vehicle communication device 6, the relay 5 stores the waveform of the transmission signal Str. When receiving the next transmission signal Str from the vehicle communication device 6, the relay 5 transmits the reply signal Str' at a predetermined reply timing with the waveform stored in the relay 5.

However, in the second embodiment, the waveform of the transmission signal Str cyclically transmitted from the vehicle communication device 6 is switched during communication of the plurality of transmission signals Str. The waveform of the reply signal Str' is set to be, for example, the same as the waveform of each transmission signal Str. Thus, after the waveform of the transmission signal Str is changed, the waveform of the transmission signal Str transmitted from the vehicle communication device 6 differs from the waveform of the transmission signal Sr stored in the relay 5. Accordingly, when unauthorized communication is performed through the relay 5, the vehicle communication device 6 receives the reply signal Str' with a waveform that differs from the waveform of the transmission signal Str and thereby recognizes that the communication is not authorized. Thus, unauthorized communication performed through the relay 5 is not established.

In addition to advantages (1) to (10) of the first embodiment, the second embodiment has the advantages described below.

(11) The signal waveform switching unit 31 switches the waveform of the transmission signal Str, which is a cyclic repetitive signal, to another shape. Thus, even when the waveform of the transmission signal Str is stored in the relay 5, after the waveform of the transmission signal is switched at a certain timing, unauthorized communication through the relay 5 is not established. This ensures security against unauthorized communication.

A third embodiment will now be described with reference to FIG. 10. The third embodiment also differs from the first embodiment in the transmission control. The difference from the first embodiment will now be described in detail.

Figure 10:
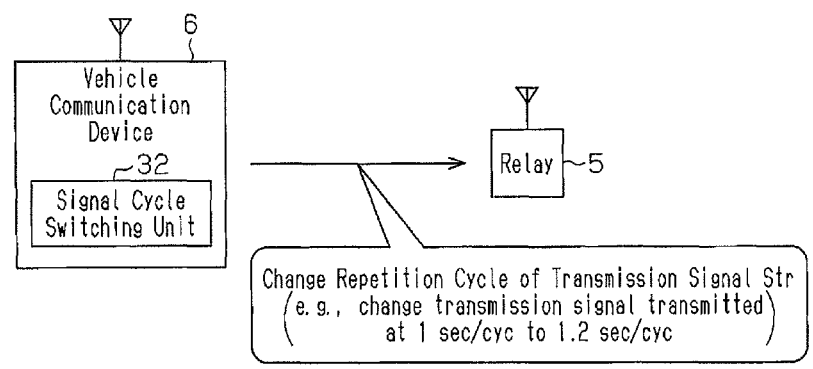
FIG. 10 is a schematic diagram illustrating a third embodiment of a signal transfer time measurement apparatus.
Figure 11:
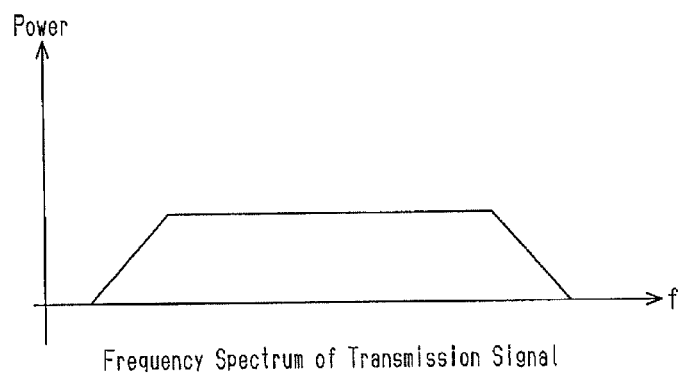
FIG. 11 is a schematic diagram illustrating the frequency spectrum of a wideband signal.
Figure 12:
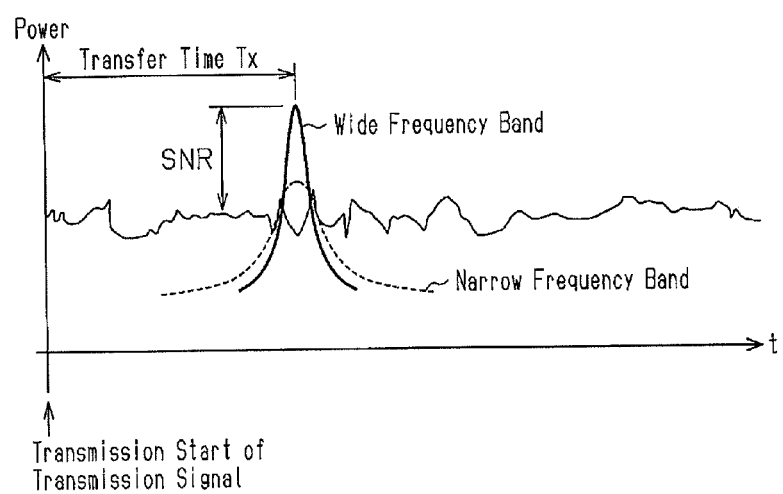
FIG. 12 is a schematic waveform diagram illustrating the SNR in a wide frequency band and the SNR in a narrow frequency band.

Referring to FIG. 10, the controller 8 of the vehicle communication device 6 includes a signal cycle switching unit 32 that switches the repetition cycle (cycle time) of the transmission signal Str, which is a cyclic repetitive signal, to another cycle. When a plurality of transmission signals Str is transmitted from the vehicle communication device 6 to the key communication device 7, the signal cycle switching unit 32 switches the repetition cycle of the transmission signal STr to another cycle at a certain timing (may be at the start of or during communication). For example, the signal cycle switching unit 32 switches the repetition cycle of the transmission signal Str from 1 sec/cycle to 1.2 sec/cycle.

When unauthorized communication is performed with the relay 5, for example, the repetition cycle of the transmission signal Str may be stored in the relay 5. For example, when receiving the transmission signal Str from the vehicle communication device 6, the relay 5 calculates the repetition cycle of the transmission signal Str by measuring the interval between the receipt of the previous transmission signal Str and the present transmission signal Str. Then, the relay 5 stores the repetition cycle. When the relay 5 receives the next transmission signal Str from the vehicle communication device 6, the relay 5 transmits the reply signal Str' to the vehicle communication device 6 at a reply timing obtained from the stored repetition cycle.

In the second embodiment, however, the repetition cycle of the transmission signal Str transmitted from the vehicle communication device 6 is switched to another cycle at a certain timing. Thus, after the switching of the repetition cycle of the transmission signal, the repetition cycle of the transmission signal Str recognized by the vehicle communication device 6 differs from the repetition cycle of transmission signal Str recognized by the relay 5. Accordingly, when unauthorized communication is performed through the relay 5, the vehicle communication device 6 receives the reply signal Str' at a different repetition cycle. Thus, the vehicle communication device 6 recognizes that the communication is not authorized. Accordingly, unauthorized communication performed through the relay 5 is not established.

In addition to advantages (1) to (10) of the first embodiment, the third embodiment has the advantages described below.

(12) The signal cycle switching unit 32 switches the repetition cycle of the transmission signal Str, which is a cycle repetitive signal, to another cycle. Thus, even when the repetition cycle of the transmission signal Str is stored in the relay 5, after the repetition cycle of the transmission signal Str is switched at a certain timing, unauthorized communication performed through the relay 5 is not established. This ensures security against unauthorized communication.

It should be apparent to those skilled in the art that the present invention may be embodied in many other specific forms without departing from the spirit or scope of the invention. Particularly, it should be understood that the present invention may be embodied in the following forms.

In each of the above embodiments, the transmission signal Str may be switched to any waveform shape. Further, the waveform shape may be changed at any timing.

In the third embodiment, the transmission signal Str may be switched to any repetition cycle. Further, the repetition cycle may be changed at any timing.

In each of the above embodiments, the correction of the transfer time Tx caused by a clock deviation is not limited to the process using the reference signal Scm. As long as a clock deviation may be calculated and the transfer time Tx may be corrected, another process may be employed to perform the correction.

In each of the above embodiments, the clock deviation calculation and transfer time correction functions do not have to be provided for both of the vehicle communication device 6 and the key communication device 7. The clock deviation calculation and transfer time correction functions may be provided for only one of the vehicle communication device 6 and the key communication device 7.

In each of the above embodiments, the narrowband frequency spectrums 22 configuring a single transmission signal Str do not have to be formed with equal intervals and identical shapes. The intervals of the frequency spectrums 22 may be changed, and the shapes of the frequency spectrums 22 may be changed.

In each of the above embodiments, the repetition cycle of the transmission signal Str is not restricted to a fixed value and may be changed.

In each of the above embodiments, the transmission signals Str have identical shapes. Instead, the shape of the transmission signal Str may be changed for each transmission.

In each of the above embodiments, a plurality of transmission signals Str are transmitted. However, a signal transmission signal Str may be transmitted.

In each of the above embodiments, the improving unit is not limited to the filter 17. For example, when receiving a signal, the noise power may be reduced by adding the obtained frequency spectrums 22.

In each of the above embodiments, the filter 17 may be omitted from the signal transfer time measurement apparatus 4. This configuration also obtains the advantages of the present invention.

In each of the above embodiments, the electronic key system 3 may be a near field communication system that performs, for example, radio frequency identification (RFID) or near field communication (NFC). The frequency of the radio wave used by the electronic key system 3 is not limited to LF or UHF and may be changed to another frequency. In the key-free operation, the frequency does not have to differ between opposite directions in bi-directional communication and may be the same. The key-free operation system may locate the electronic key 2 (inside or outside the vehicle, specific location inside or outside the vehicle) by checking the combination of responses from the electronic key 2 for communication from transmitters arranged at different parts of the vehicle 1 (e.g., transmitters arranged in right side of vehicle body, left side of vehicle body, trunk, and so on).

In each of the above embodiments, the application of the signal transfer time measurement apparatus 4 is not limited to the electronic key system 3 and may be applied to other communication systems. Further, the signal transfer time measurement apparatus 4 is not limited to use with the vehicle 1 and may be applied to other apparatuses or devices.

In each of the above embodiments, the vehicle 1 is not limited to a vehicle that burns fossil fuel to produce power and may be, for example, a hybrid vehicle, a plugin hybrid vehicle, or an electric vehicle.

The present examples and embodiments are to be considered as illustrative and not restrictive, and the invention is not to be limited to the details given herein, but may be modified within the scope and equivalence of the appended claims.

The invention claimed is:

1. A signal transfer time measurement apparatus that measures a transfer time of a signal transmitted from a base station and returned via a terminal to the base station, the signal transfer time measurement apparatus comprising:
   a controller that is configured to determine whether a communication performed between the base station and the terminal is authorized or unauthorized, the controller including a signal processor and a transfer time calculation unit,
   wherein the signal processor is configured to divide the signal into a plurality of frequency bands and transmit a plurality of narrowband signals in the plurality of frequency bands,
   wherein the transfer time calculation unit is configured to calculate the transfer time by using one of the plurality of narrowband signals, and
   wherein the controller is configured to determine that the communication performed between the base station and the terminal is unauthorized when the transfer time calculated by the transfer time calculation unit is greater than or equal to a threshold.

2. The signal transfer time measurement apparatus according to claim 1, further comprising:
   an improving unit that improves a signal to noise ratio of the signal received by the base station by processing the signal in frequency spectrums respectively corresponding to the frequency bands.

3. The signal transfer time measurement apparatus according to claim 2,
   wherein the base station includes a filter serving as the improving unit.

4. The signal transfer time measurement apparatus according to claim 1,
   wherein frequency spectrums respectively corresponding to the frequency bands are formed at equal intervals with identical shapes.

5. The signal transfer time measurement apparatus according to claim 1,
   wherein the signal is a cyclic repetitive signal.

6. The signal transfer time measurement apparatus according to claim 5, further comprising:
   a signal waveform switching unit that switches a waveform of the signal, which is the cyclic repetitive signal, to another shape.

7. The signal transfer time measurement apparatus according to claim 5, further comprising:
   a signal cycle switching unit that switches a repetition cycle of the signal, which is the cyclic repetitive signal, to another cycle.

8. The signal transfer time measurement apparatus according to claim 1, further comprising:
   a clock deviation calculation unit that calculates a clock deviation of at least one of the base station and the terminal; and
   a correction unit that corrects the transfer time based on a calculation result of the clock deviation calculation unit.

9. The signal transfer time measurement apparatus according to claim 8,
   wherein the clock deviation calculation unit calculates the clock deviation of the terminal by detecting a frequency deviation of a reference signal having a single frequency and transmitted from the terminal to the base station.

10. The signal transfer time measurement apparatus according to claim 8,
    wherein the correction unit switches a filter shape of a reception filter arranged in the base station and the terminal.

11. The signal transfer time measurement apparatus according to claim 1,
    wherein the terminal generates a reply signal by adding a certain change to the signal transmitted from the base station and returns the reply signal to the base station.

* * * * *